Aug. 11, 1959 — R. B. SAALFRANK — 2,898,867
PUMP WITH SEALING ARRANGEMENT
Filed Nov. 29, 1954 — 2 Sheets-Sheet 2

2,898,867
PUMP WITH SEALING ARRANGEMENT

Royal Bartlett Saalfrank, Gulfport, Fla., assignor to Milton Roy Company, Philadelphia, Pa., a corporation of Pennsylvania Application November 29, 1954, Serial No. 471,623

17 Claims. (Cl. 103—153)

This invention relates to pumps of the reciprocating type and has for an object the provision of novel sealing arrangements for said pumps whereby the length of the plunger may be materially shortened and at the same time permit easy withdrawal of the pump packing for inspection or replacement without removal of the pump plunger.

In general most plunger type pumps use a sliding crosshead to translate the angular thrust of the connecting rod to a linear motion of the plunger. The crosshead is increased in length to give proper guiding as the plunger diameter is increased and the plunger overhang is increased, as in pumps of the controlled-volume type such, for example, as shown in Sheen Patent No. 2,587,395. This is particularly true when the plunger floats with respect to the crosshead and thus the plunger has a centering action within the packing. It is highly desirable, therefore, to keep the pump plunger length to a minimum and this is accomplished in accordance with the present invention by eliminating the long sealing length within the packing gland and the customary catch-all and providing packing for the pump that may be inserted or removed through an opening in the wall of the plunger chamber.

More particularly, in one form of the invention there is provided a pump of the reciprocating piston type with a pump housing having a piston chamber, the latter having inlet and outlet means respectively connecting therewith at spaced sides of the chamber. The housing is provided with sealing means forming circumferential seals of substantial length along the piston and along the piston chamber. The seals are maintained effective by pressure acting upon the sealing means. The piston is actuated from an operating mechanism by way of a guide rod connected at one end to said piston and having a bearing member. A stationary support having a bearing surface for the bearing member extends outwardly from the piston chamber from a point in close proximity to the adjacent one of the limits of the maximum stroke of the piston whereby the overall length from the guide rod and piston connection to the sealing means is greatly minimized.

In a further aspect of the invention sealing means is provided between the stationary support for the bearing member and the housing to seal the bearing member with respect to the piston chamber for maintaining a lubricating fluid within the support to lubricate the bearing member and the bearing surface throughout the entire stroke of the piston.

In another aspect of the invention there is provided means for minimizing the wear on the packing of a variable-volume pump including an elongated plunger and a multiple valve device having a plunger chamber extending through the body of the device. The multiple valve device is provided with inlet and outlet valves arranged one above the other in a common plane. The inlet and outlet valves are in communication with the plunger chamber and the common plane is substantially perpendicular to the axis of the chamber. Packing means is interposed between the plunger and the chamber and it is of substantial length along the plunger. A guide rod is rigidly secured to the plunger and includes a bearing member. There is provided a support including a bearing surface for the bearing member and for the guide rod disposed in close proximity to the packing means. A fluid-tight seal may also be provided between the support and the body of the multiple valve device.

For a more detailed understanding of the invention and for further objects and advantages thereof, reference is to be had to the following description taken in conjunction with the accompanying drawings, in which.

Figure 1:
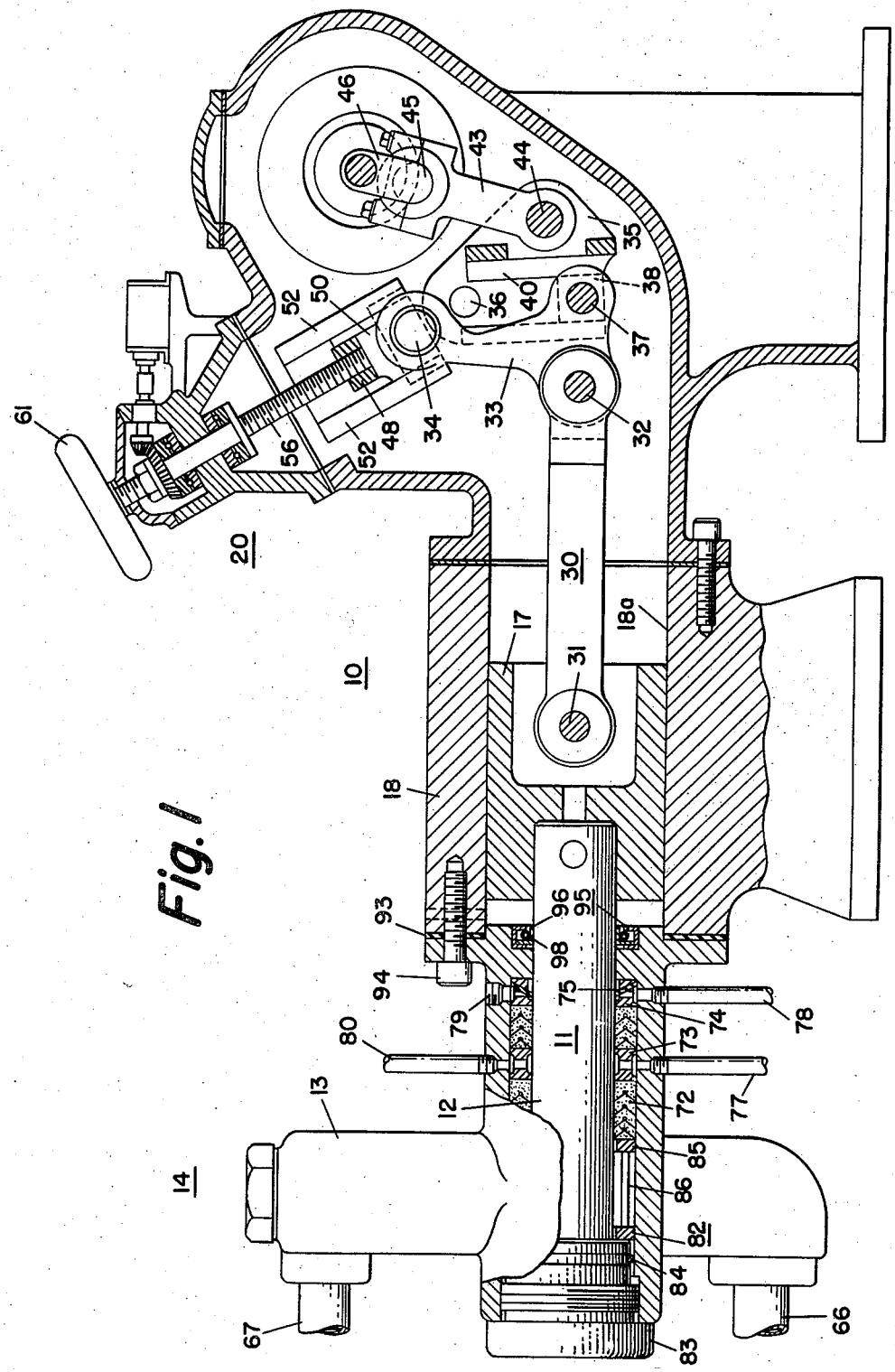
Fig. 1 is a side elevation partly in section of one embodiment of the invention.

Referring to the drawing, there is shown in Fig. 1 a reciprocating pump 10 of the controlled-volume type and particularly suited for chemical pumping applications. The pump 10 includes a plunger or piston 11 reciprocable within a cylindrical bore forming a chamber 12 in the housing or body member 13 of a multiple valve device 14 which comprises the liquid end of the pump 10 and is sold under the trademark "Step-Valve." The plunger 11 is connected to one end of a guide rod or crosshead 17, the latter forming a bearing member adapted to slide on the cooperating bearing surface 18a of a stationary support 18. As illustrated the support 18 surrounds the crosshead 17 and forms an enclosure for the latter, the purpose of which will later be described.

The mechanism 20 for operating the guide rod 17 is pivotally connected at 31 to the end of member 17 remote from the plunger 11. The mechanism 20 has been illustrated as of the type fully disclosed and claimed in Saalfrank Patent No. 2,640,425 and includes means for stroke adjustment. It is to be understood that the mechanism 20 may be of any suitable type and is not limited to the particular mechanism illustrated. For purposes of explanation like parts of mechanism 20 have been provided with the same reference characters as in the mechanism disclosed in said Patent No. 2,640,425 where possible.

Briefly, the mechanism 20 includes a connection at 32 pivotally connecting the end of connecting rod 30 remote from the pump plunger to an adjustment rocker 33, which rocks around pivot 34. Pivot 34 is the adjustment pivot which is moved linearly for the purpose of adjustment of the pump stroke but which once adjusted remains in the particular adjustment position and provides pivotal support for adjustment rocker 33. The adjustment rocker 33 is swung back and forth by adjustment block 35 which is mounted on a fixed pivot 36 and is interconnected with adjustment rocker 33 by movable pivot 37. The movable pivot 37 carries a sliding block 38 which is guided by guideways 40.

Swinging motion is imparted to adjustment block 35 about its fixed pivot 36 by connecting rod 43 pivotally connected at 44 to the adjustment block and pivotally connected at 45 to driving crank 46. The driving crank 46 may be driven in any suitable manner, for example by an electric motor and gear reduction not shown.

The variation in stroke is accomplished by varying the position of adjustment pivot 34 toward and away from fixed pivot 36. This is accomplished by any suitable linear adjustment mechanism. In the form shown, adjustment pivot 34 is mounted on nut 48 by yoke arms 50 which mount the adjustment pivot. The yoke arms are guided in guideways 52. The nut 48 can be manipulated in any suitable way as by the hand wheel 61 which rotates adjustment screw 56 which makes threaded engagement with nut 48.

For further description of the operation of mechanism 20 reference may be had to the aforesaid Patent No. 2,640,425.

Figure 3:
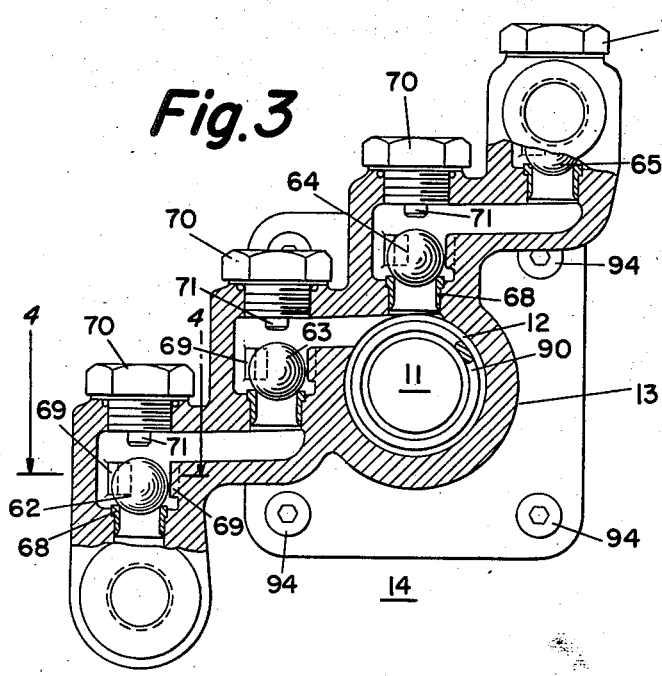
Fig. 3 is an end elevation partly in section, the section being taken along the line 3—3 in Fig. 2.

The multiple valve device or liquid end 14 of the pump 10 includes a pair of inlet valves 62, 63 and a pair of outlet valves 64, 65, Fig. 3, similar to the multiple valve arrangement disclosed in Sheen Patent No. 2,263,429. It will be noted, however, that the plunger chamber 12 in the body 13 of multiple valve device 14 is disposed at substantially right angles to the common plane of valves 62—65.

Figure 4:
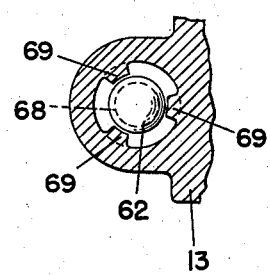
Fig. 4 is a fragmentary section taken along the line 4—4 in Fig. 3.

As shown in Fig. 3 the uppermost inlet valve 63 is in direct communication with chamber 12, as is the lowermost outlet valve 64. The inlet valves 62, 63 and outlet valves 64, 65 are serially connected between the inlet connection 66 and the outlet connection 67, Figs. 1–3. Each of the valves 62—64 is of generally similar construction with the respective balls thereof adapted to engage a seat 68 disposed beneath ball guides 69, Fig. 4, and threaded plug members 70, the lower ends of which include extensions 71 for limiting the upper movement of the balls. For further description of the operation of the individual ball valves, reference may be had to the aforesaid Sheen Patent No. 2,263,429.

In accordance with the present invention, by disposing the piston chamber 12 at right angles with respect to the plane of the ball valves, it is positioned greatly to shorten the length of the piston 11 and decrease the overhung load as applied back to the crosshead 17.

Further in accordance with the invention, the packing means, which has been illustrated as including a plurality of packing rings 72 of the chevron type, may be inserted through an open end in body member 13 which is directly in line with the piston chamber 12. The packing means in Fig. 1 has also been illustrated as including a lantern ring 73 which divides the packing into two sections, and at the rear of the piston chamber 12 there is provided another ring 74 of the lantern type which also may include a lip seal 75. As will be noted, passageways are provided through the walls of body member 13 and opposite the ring members 73 and 74 to permit the escape of any leakage of fluid through the packing ring 72.

Pipes 77 and 78 have been illustrated as forming the flow connections for discharge of said leakage. The cavity at the end of chamber 12 that receives the ring 74 corresponds to the catch-all that has been required in piston-type pumps prior to this invention. It will be noted that the length of the catch-all area in this invention has been materially shortened over the catch-alls required in the prior art. In order to use a flush stream for aiding in the removal of any fluid that leaks into the catch-all through the packing 72, there has been shown a threaded port 79 through which the flush stream may be introduced into the catch-all area and discharged through the lower pipe 78. A similar inlet pipe 80 has been shown in Fig. 1, and it is to be understood that a flush stream may be directed through the lantern ring 73 and discharged therefrom by way of the lower pipe 77.

It is further to be understood that when a flush stream is being passed through the ring member 74, the pipes 77 and 80 to the ring 73 may be eliminated, if desired. Likewise, the flush stream may be passed through pipes 80 and 77 without the need of passing a flush stream through port 79.

The packing ring 72 and the lantern rings 73 and 74 are held against the rear end of chamber 12 by means of a perforated spacer 82 which, in turn, is compressed against the packing means by means of a removable end-cap 83 disposed in the open end of chamber 12. The end-cap 83 may be adapted for threaded engagement with body member 13, and there may be provided an O-ring 84 to form a seal between the chamber in the multiple valve device 14 and the end-cap 83. The spacer member 82 may be of any suitable type and has been illustrated, by way of example, as including a pair of spaced annular rings 85 surrounding the piston 11 in Fig. 1, the rings 85 being separated by a plurality of rod members 86 spaced circumferentially around the rings 85. With this construction the liquid being pumped through the multiple valve device 14 may pass through the spacer member 82 from inlet valve 62 through chamber 12 and out through outlet valve 64.

Figure 2:
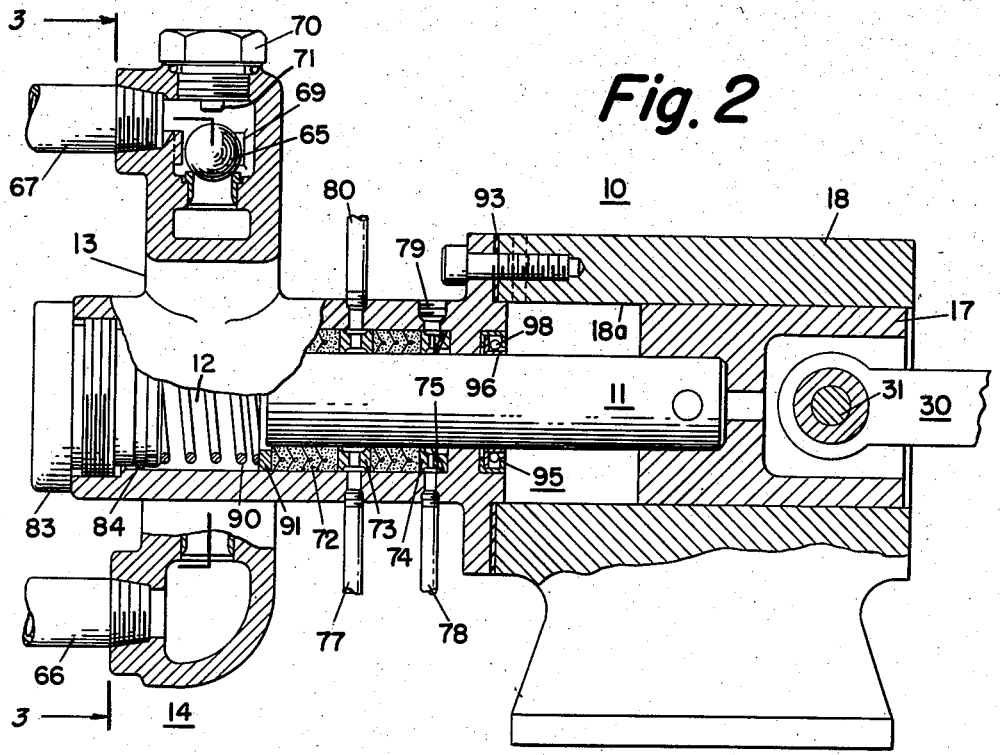
Fig. 2 is a fractional side elevation partly in section of a modification of the invention.

In the modification of the invention shown in Fig. 2 the rigid spacer member 82 has been replaced by a compression spring 90 which is held under compression between a packing-engaging ring 91 and the removable cap 83. As in the embodiment illustrated in Fig. 1, the spring 90 holds the packing rings 72 under compression, thus forcing the packing rings 72 into sealing engagement with the cylindrical surface of chamber 12 and the surface of piston or plunger 11.

Since the end-cap 83 is disposed in an opening in body member 13 which is in alignment with the plunger 11 and chamber 12, the compression means 82 or 90 may be removed from within chamber 12 and the packing means readily withdrawn for inspection or replacement. With the present construction, however, it will not be necessary to replace the packing as often as in the past, since by shortening the plunger, the overhung load with respect to the crosshead has been greatly reduced. This eliminates a considerable amount of wear both on the crosshead and on the packing means.

In many applications it is desirable that the crosshead 17 be lubricated throughout the full stroke of the piston, as this tends to decrease the wear on the crosshead. In accordance with the present invention, provision has been made for permitting the stationary support 18 to be totally enclosed so that the crosshead 17 may be operated in oil or other lubricating fluid. To this end, there is provided a gasket 93 forming a fluid-tight seal between the end of body member 13 and member 18. The members 13 and 18 may be secured together by any suitable means, such for example, as screws 94, that extend through holes in the flange of body member 13 and are threadedly received by member 18. In order to prevent the oil within enclosure 18 from leaking along the surface of piston 11 into chamber 12, there is provided an oil-retaining closure seal 95 that surrounds the piston 11 and is disposed within a recess in the adjacent face of body member 13. The seal 95 may be of any suitable type and has been illustrated as including a lip-type sealing member 96 that is pressed against the surface of piston 11 by means of a pressure ring member 98. Thus the sealing ring 95 acts to prevent the oil from passing into chamber 12 and contaminating the liquid being pumped through multiple valve device 14, and the packing ring 72, as well as the seal 75, cooperates to prevent leakage of the pumped fluid into the enclosure 18, whereby there is eliminated any contamination of the pumped liquid with the oil, and vice versa. Should any oil pass through the seal 95, it will be removed through the discharge pipe 78 and thus will be prevented from contaminating the liquid being pumped through the multiple valve device 14.

Having described the invention, it will now be apparent that it has many advantages. It permits the very material shortening of the catch-all area, and in many cases in the past the length of the catch-all area required was equal to one or more times the length of the piston stroke. With the present invention, the catch-all area never requires a length more than sufficient for a port of escape of packing leakage, such port generally being of no larger size than to accommodate ½″ or ¾″ pipe. It is, of course, understood that other pipe sizes may be utilized, if desired, in accordance with the particular application.

By enabling the catch-all length to be reduced, there results a material reduction in the size of the casting required, as well as its cost. There likewise results a material reduction in the length of the pump plungers which also represents a reduction in cost, as many times the plungers utilized in chemical pumping applications are constructed from high-cost materials.

As has already been pointed out, the shortening of the plunger greatly reduces the overhanging load on the crosshead, and thus reduces the wear on the crosshead, as well as on the packing.

It shall be understood the invention is not limited to the specific arrangements shown, and that changes and modifications may be made within the scope of the appended claims.

What is claimed is:

1. A pump of the reciprocating type comprising in combination a piston, a pump housing having a piston chamber and a flange at one end of said housing, said piston being disposed in said piston chamber, inlet and outlet means respectively connecting with said chamber at spaced sides thereof, sealing means within said housing forming circumferential seals of substantial length along said piston and along said piston chamber, pressure means acting on said sealing means to maintain effective said seals, said sealing means and said pressure means both being accessible from the end of said pump housing opposite said flange end a guide rod connected at one end to said piston and having a bearing member, a stationary support, means for connecting an end of said support to said housing flange in line with said piston chamber, said support having a bearing surface for supporting said bearing member over its entire length during its stroke from one maximum limit to the other, said bearing surface extending outwardly from said piston chamber from a point in close proximity to the adjacent one of the limits of the maximum stroke of said piston, and means connected to said guide rod for reciprocating said piston, the overall length from said last-named connection to said sealing means being thereby minimized.

2. A pump according to claim 1 wherein said sealing means comprises spaced sealing members carried by said housing, escapement means separating said sealing members a short distance axially of said piston chamber for escapement of any leakage through said sealing members.

3. A pump according to claim 2 wherein said escapement means between said sealing members includes flow connections for a flushing fluid.

4. A pump according to claim 3 wherein said stationary support is totally enclosed and adapted to contain a lubricating fluid in contact with said bearing member and said bearing surface, and an additional sealing member at said flange end of said pump housing to seal said stationary support for said bearing member with respect to said piston chamber for maintaining said lubricating fluid within said support to lubricate said bearing member and said bearing surface throughout the entire stroke of said piston.

5. A pump according to claim 1 wherein said pressure means acting on said sealing means comprises mechanical means for pressing said sealing means in sealing relation to said piston.

6. A pump according to claim 1 wherein said sealing means includes spaced packing sections within said piston chamber, said packing sections being separated a short distance axially of said piston chamber by a discharge port.

7. A reciprocating pump for liquid comprising in combination, a piston, a pump housing having a piston chamber receiving said piston, inlet and outlet valves for said liquid respectively connecting with said chamber at spaced sides thereof, packing means within said piston chamber forming circumferential seals of substantial length, one along said piston and the other along said piston chamber, means within said piston chamber engaging said packing means to maintain effective said seals, said packing means and said last-named means both being accessible through said piston chamber, a guide rod connected at one end to said piston and having a bearing member, a stationary supporting enclosure connecting with an end of said pump housing in line with said piston chamber and having a bearing surface for supporting said bearing member over its entire length during its stroke from one maximum limit to the other, said bearing surface extending outwardly from said piston chamber from a point in close proximity to the adjacent one of the limits of the maximum stroke of said piston, means connected to said guide rod for reciprocating said piston, the overall length from said last-named connection to said packing means being thereby minimized, and sealing means encircling said piston in sealing relation thereto and disposed between said packing means and said stationary supporting enclosure for maintaining a lubricating fluid within said enclosure to lubricate said bearing member and said bearing surface throughout the entire stroke of said piston.

8. A pump according to claim 7 including discharge means separating said packing means and said sealing means a short distance axially of said piston for escapement of any leakage through said packing means and said sealing means in avoidance of contamination of said liquid being pumped with the lubricating fluid in said stationary supporting enclosure and vice versa.

9. A pump according to claim 8 including inlet means flow connected with said discharge means for passage therethrough of an auxiliary flushing fluid.

10. A pump of the controlled-volume type comprising in combination a piston, multiple valve means having serially connected inlet valves located one above the other, a centrally extending opening in said multiple valve means forming a piston chamber, said piston being disposed within said piston chamber, the upper one of said inlet valves being in direct communication with the lowermost portion of said piston chamber, and serially connected outlet valves disposed one above the other with the lowermost one of said outlet valves in direct communication with the uppermost portion of said piston chamber, packing means within said piston chamber forming circumferential seals of substantial length one along said piston and the other along said piston chamber, means within said piston chamber engaging said packing means to maintain effective said seals, a guide rod connected at one end to said piston and having a bearing member, a stationary support connecting with an end of said multiple valve means in line with said piston chamber and having a bearing surface for supporting said bearing member over its entire length during its stroke from one maximum limit to the other, said bearing surface extending outwardly from said piston chamber from a point in close proximity to the adjacent one of the limits of the maximum stroke of said piston, and means connected to said guide rod for reciprocating said piston, the overall length from said last-named connection to said packing means being thereby minimized.

11. A pump of the controlled-volume type comprising in combination multiple valve means including a body member having serially connected inlet valves located one above the other in a common plane, a centrally disposed opening in said body member extending transversely of said common plane and forming a piston chamber, a piston within said piston chamber, the upper one of said inlet valves being in direct communication with the lowermost portion of said piston chamber, and serially connected outlet valves disposed one above the other with the lowermost one of said outlet valves in direct communication with the uppermost portion of said piston chamber, packing means within said piston chamber forming circumferential seals of substantial length one along said piston and the other along said piston chamber, means within said piston chamber engaging said packing means to maintain effective said seals, a guide rod connected at one end to said piston and having a bearing member, a stationary support connecting with an end of said body member in line with said piston chamber and having a bearing surface for supporting said bearing member over its entire length during its stroke from one maximum limit to the other, said bearing surface extending outwardly from said piston chamber from a point in close proximity to the adjacent one of the limits of the maximum stroke of said piston, and means connected to said guide rods for reciprocating said piston, the overall length from said last-named connection to said packing means being thereby minimized.

12. Means for minimizing the wear on the packing of a variable-volume pump comprising an elongated plunger, a multiple valve device including a body having a plunger chamber extending through said body of said device and receiving said plunger, packing means interposed between said plunger and said chamber and of substantial length along said plunger, a guide rod rigidly secured to said plunger having a bearing member, a support connecting with an end of said body member in line with said plunger chamber and including a bearing surface for supporting said bearing member over its entire length during its stroke from one maximum limit to the other, said bearing surface for said guide rod being disposed in close proximity to said packing means, and a fluid-tight seal between said support and said body of said multiple valve device.

13. Means for minimizing the wear on the packing of a variable-volume pump comprising an elongated plunger, a multiple valve device including a body having a plunger chamber extending through said body of said device and receiving said plunger, inlet and outlet valves of said device arranged one above the other in a common plane in communication with said plunger chamber, said plane being substantially perpendicular to the axis of said chamber, packing means interposed between said plunger and said chamber and of substantial length along said plunger, a guide rod rigidly secured to said plunger having a bearing member, and a support connecting with an end of said body in line with said plunger chamber and including a bearing surface for supporting said bearing member over its entire length during its stroke from one maximum limit to the other, said bearing surface for said guide rod being disposed in close proximity to said packing means.

14. An arrangement according to claim 13 wherein said body of said multiple valve device includes an opening therethrough at its opposite end in line with said plunger chamber for insertion and withdrawal of said packing means without removal of said plunger, and removable means filling said opening.

15. An arrangement according to claim 14 including compression means surrounding said plunger and extending along the axis thereof, the opposite ends of said compression means respectively engaging said removable means and said packing means to maintain said packing means in sealing relation with said plunger and said chamber.

16. An arrangement according to claim 15 wherein said compression means comprises a spacing device including elements thereof spaced apart to permit flow through said chamber from said inlet valves to said outlet valves.

17. An arrangement according to claim 15 wherein said compression means comprises a coil spring having spaced coils to permit flow through said multiple valve device.

References Cited in the file of this patent

UNITED STATES PATENTS

| | | |
|---|---|---|
| 571,702 | Stumpf | Nov. 17, 1896 |
| 1,376,043 | Sherwood | Apr. 26, 1921 |
| 1,386,219 | Archer | Aug. 2, 1921 |
| 1,435,362 | Wintroath | Nov. 14, 1922 |
| 1,454,682 | Layne | May 8, 1923 |
| 1,800,833 | Huff | Apr. 14, 1931 |
| 1,850,614 | Aisenstein | Mar. 22, 1932 |
| 2,045,024 | Renken | June 23, 1936 |
| 2,077,571 | Lenarth | Apr. 20, 1937 |
| 2,292,543 | Patterson | Aug. 11, 1942 |
| 2,332,150 | Huff | Oct. 19, 1943 |
| 2,367,893 | Sheen | Jan. 23, 1945 |
| 2,415,571 | Yuza | Feb. 11, 1947 |
| 2,439,957 | Anderson | Apr. 20, 1948 |
| 2,733,664 | Saalfrank | Feb. 7, 1956 |